(12) United States Patent
Kumar et al.

(10) Patent No.: US 11,601,523 B2
(45) Date of Patent: Mar. 7, 2023

(54) PREFETCHER IN MULTI-TIERED MEMORY SYSTEMS

(71) Applicant: Intel Corporation, Santa Clara, CA (US)

(72) Inventors: Karthik Kumar, Chandler, AZ (US); Francesc Cesc Guim Bernat, Barcelona (ES); Thomas Willhalm, Sandhausen (DE); Martin P Dimitrov, Chandler, AZ (US); Raj K. Ramanujan, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1494 days.

(21) Appl. No.: 15/382,103

(22) Filed: Dec. 16, 2016

(65) Prior Publication Data
US 2018/0176324 A1   Jun. 21, 2018

(51) Int. Cl.
*H04L 67/5681* (2022.01)
*H04L 67/10* (2022.01)

(52) U.S. Cl.
CPC .......... *H04L 67/5681* (2022.05); *H04L 67/10* (2013.01)

(58) Field of Classification Search
None
See application file for complete search history.

(56) References Cited

U.S. PATENT DOCUMENTS

| | | | | |
|---|---|---|---|---|
| 2003/0009643 A1* | 1/2003 | Arimilli | ............... | G06F 12/0831 711/155 |
| 2005/0198400 A1* | 9/2005 | Minturn | ............... | G06F 12/1081 709/250 |
| 2012/0290793 A1* | 11/2012 | Chung | ................ | G06F 12/0897 711/119 |
| 2016/0371187 A1* | 12/2016 | Roberts | ............... | G06F 12/0638 |

* cited by examiner

*Primary Examiner* — Jared I Rutz
*Assistant Examiner* — Marwan Ayash
(74) *Attorney, Agent, or Firm* — Compass IP Law PC

(57) ABSTRACT

Generally discussed herein are systems, devices, and methods for prefetcher in a multi-tiered memory (DSM) system. A node can include a network interface controller (NIC) comprising system address decoder (SAD) circuitry configured to determine a node identification of a node to which a memory request from a processor is homed, and prefetcher circuitry communicatively coupled to the SAD circuitry, the prefetcher circuitry to determine, based on an address in the memory request, one or more addresses from which to prefetch data, the one or more addresses corresponding to respective entries in a memory of a node on a different network than the NIC.

34 Claims, 9 Drawing Sheets

PREFETCHER IN MULTI-TIERED MEMORY SYSTEMS

TECHNICAL FIELD

Embodiments generally relate to computing systems and, more particularly, to systems, devices, and methods for prefetcher in multi-tiered memory systems.

TECHNICAL BACKGROUND

Computer processing nodes include system address decoders (SADs) to determine to which memory a request is directed. Current hardware prefetching schemes are implemented within the node (commonly at L1 or L2 level). Data can be prefetched based on the stream of addresses issued in a thread(s) running in a specific core. Current hardware prefetching schemes are limiting in their usefulness at least because they only see traffic within their specific core, and they do not interact with the rest of the node participating in a larger system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
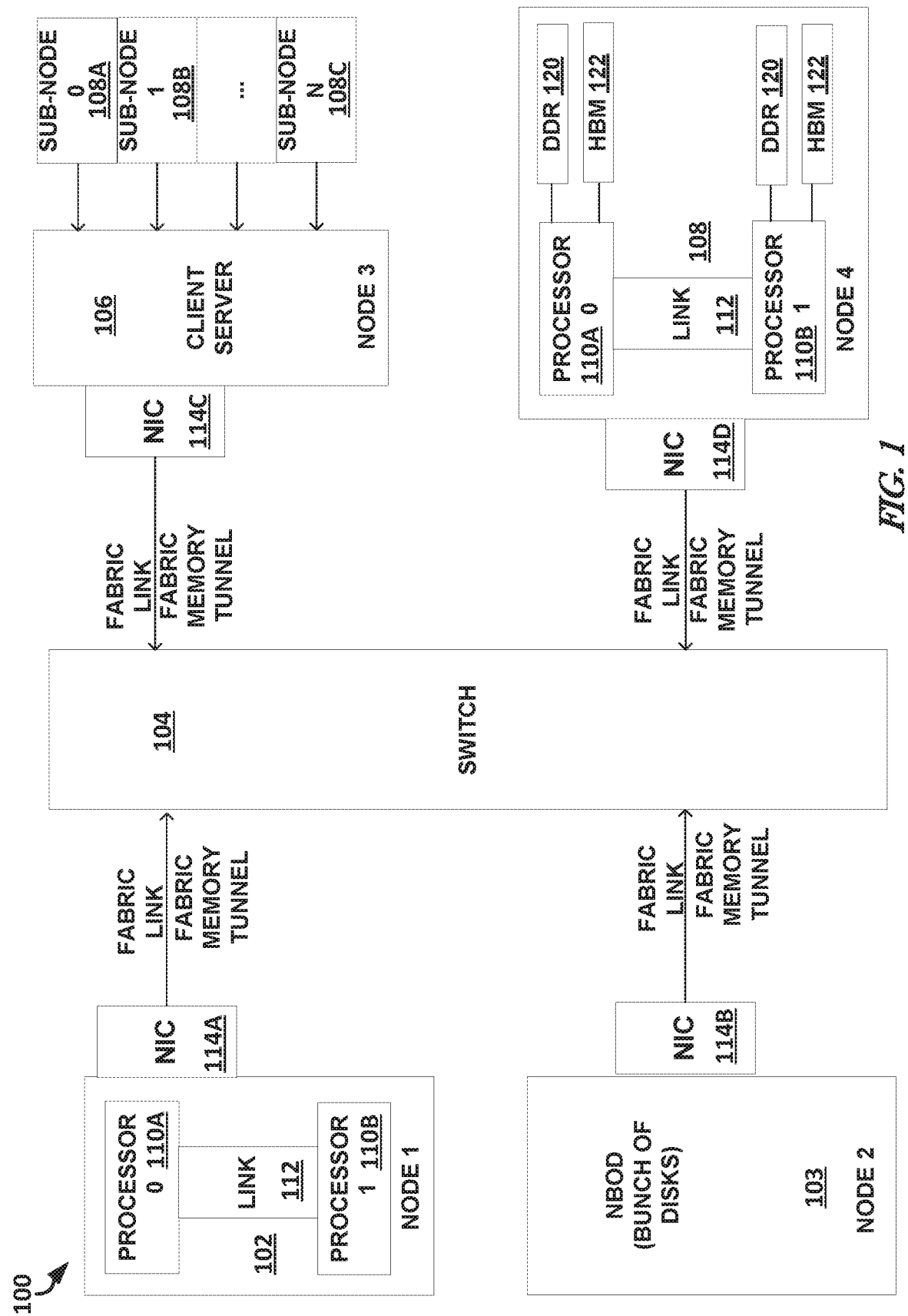
FIG. 1 illustrates, by way of example, a logical block diagram of an embodiment of a DSM system.

Examples in this disclosure relate to devices and systems that include multiple tiers of memory and that implement prefetchers in the multiple tiers of memory, such as can include a distributed shared memory (DSM). A DSM is a memory architecture where physically separate memories are addressed as one shared address space. Shared means that the address space is shared such that a same physical address from two physically separate processors refers to a same location in the DSM. The memories of the DSM can include different types of memories (e.g., memories from different manufacturers, with different access latencies, bandwidths, read times, write times, or the like).

Non-uniform memory access latency (NUMA) is becoming more prevalent in DSM systems. Many factors can impact the prevalence of NUMA, such as can include one or more of: (1) emergence of new memory technologies, such as three-dimensional cross-point (3D Xpoint™) non-volatile memory, or other memory technologies; (2) emergence of large "scale up" systems with large memory banks (e.g., terabytes of memory banks) organized into several NUMA domains; and (3) emergence of very fast interconnects (e.g., Omni-Path fabrics, such as from Intel Corporation or Santa Clara, Calif., United States) and a trend towards lower latency remote memory access semantics being provided by fabric controllers. This can include remote memory exposed through memory semantics to a node. Over the next five-year time frame, DSM systems have been projected to have remote memory access latencies within about a microsecond, making scale out NUMA systems with remote access latencies several times larger than local access latencies.

With heterogeneous access latencies, a natural contention point that occurs is in the shared buffers on a memory access path. Entries in these structures will be occupied for longer by the higher latency requests, leading to potential starvation of slots for lower latency requests. This starvation can result in a pipeline bottleneck and/or bandwidth throttling. Such bottlenecks or throttling can be offset by limiting usage of such higher latency structures in the shared queues.

One effective way to reduce memory access latencies can include prefetching. Prefetching can be particularly effective when used with memory accesses having a predictable access pattern. For example, columnar, in-memory databases can incur up to about thirty percent performance penalty to higher latency memories (e.g., 3D cross-point like latencies) when the prefetcher is disabled. However, prefetched data occupies valuable slots in shared buffers and can exacerbate the starvation and/or bottleneck problem previously discussed.

Consider an application that is sequentially scanning a column of data stored in memory (e.g., addressees A, A+1, A+2, A+3, A+4, etc.). An adjacent cache line prefetcher can be successful and beneficial in such a case. While each of these prefetches will be successful (e.g., results in a cache hit) they occupy respective slots in the buffer(s). In such a case, it can be more efficient to issue a single prefetch for all four cache lines (e.g., pre-fetch 256 bytes instead of 64 bytes with one request). Such a larger prefetcher can help mask heterogeneous memory latency issues, such as those previously discussed.

Some hardware prefetcher solutions are implemented and designed at a processor core level or a last level cache (LLC) level. Such solutions may not be helpful in DSM architectures, unless implemented on every processor core or LLC. In DSM architectures, memory access can be tunneled over one or more network interface controllers (NICs), such as can include a host fabric interconnect (HFI) of the requester node(s).

Some prefetching schemes are limited in that they only have a view from a core or LLC perspective. In such prefetching schemes, the prefetchers only see traffic from a thread in the local core, such that no write (put) or read (get) operations are generated using multiple memory input output (MIO) access schemes. The prefetchers do not interact with the rest of the nodes of the system.

A priority of a specified prefetch can be expressed in terms of urgency (e.g., not urgent, least urgent, medium urgent, etc.). A depth of a prefetch (e.g., amount of data prefetched) can be expressed in terms of levels, such as shallowest, shallow, medium, deep, deeper, and deepest, or the like. One or more embodiments discussed herein can include different prefetching schemes for different memory technologies and/or memory tiers, such as can include different parameters for different memory technologies and/or tiers. In one or more embodiments, the prefetchers can set one or more parameters based on distance to the memory to which a request is homed (e.g., fabric and/or remote node access times), memory characteristics (e.g., bandwidth, read/write times, or other latency characteristics) and/or QoS of the DSM system. Depending on how the prefetcher behaves, DSM system performance can be harmed by demand loads and/or data storage required by the prefetchers. For example, a prefetcher can use too much fabric bandwidth and interfere with a non-prefetch request from an application, thus slowing down the processing for the application, rather than speeding up the processing for the application.

In one or more embodiments, the prefetchers can be configured based on a variety of parameters, such as can include memory technology implemented by the memory that is the target of a request, a location of the memory that is the target of the request, and/or QoS characteristics. Such parameters can include a prefetch type (e.g., stride, predictive, or machine-learning based, among others), a latency target that the prefetcher is meant to mask, such as requests directed to addresses associated with a latency time that is above a threshold latency time, a maximum amount of cache of the fabric that can be dedicated to storing prefetched memory (e.g., an injection rate can be based, at least in part, on this parameter), prefetcher granularity (e.g., how much data one prefetch returns from the NUMA domain), which can have an increased importance when prefetcher data from a memory with a larger latency, and the QoS (e.g., how much memory bandwidth the prefetcher is allowed to occupy, such as without interfering with other application or prefetch traffic). The prefetchers can be per NUMA domain and/or per access type (e.g., a local load/store request or fabric get/put request). Access patterns for load/store requests can be different than patterns for get/put requests, so different prefetch parameters can be used to help account for these differences.

For example, consider a prefetcher that is targeting a NUMA domain that includes a cross-point memory located in a remote node with an average access latency of about six microseconds. The prefetcher can be configured to implement a stride scheme, generate prefetches to hide the six microsecond latency and not interfere with other fabric traffic, such as by not generating more than five hundred megabits per second of prefetched data and to retrieve data from four addresses with each prefetch, such as to reduce the number of prefetches executed.

One or more embodiments discussed herein can provide one or more advantages, such as can include (1) a NIC using more remote address requests, such as to perform better prefetch prediction, (2) increased predictor accuracy and/or efficiency, such as by basing prediction on put/get operation (s) generated by memory-mapped input/output (MMIO), (3) increased address access prediction accuracy and reduced latency because the NIC can include circuitry that provides individual address predictors for each of load requests and get requests, respectively, thus; (4) QoS considerations in the prefetcher can help improve application operation efficiency and/or reduce impact of the prefetcher on the overall system, such as by setting parameters of the prefetcher (e.g., injection rate and/or granularity based on characteristics of memory targeted, NIC and/or fabric utilization, and/or feedback from the node to which a request is homed).

FIG. 1 illustrates, by way of example, a logical block diagram of an embodiment of a portion of a DSM system 100. The system 100 as illustrated includes a plurality of local nodes 102 and 103 and a plurality of remote nodes (e.g., 106 and 108) communicatively coupled through network interface controllers 114A, 114B, 114C, and 114D, and a switch 104. One or more of the components of the DSM system 100, in one or more embodiments, can be a part of or communicatively coupled to an enterprise data center. The switch 104, in one or more embodiments, can include a NIC 114E that can help in connecting the switch 104 to a particular lane that connects to an end node. The switch 104 can be one of a plurality of switches.

The DSM system 100 includes compute nodes (e.g., the node 102A) and pooled-resource nodes (e.g., the remote memory, such as can be part of sub-nodes 108A, 108B, and 108C and or the node 108). The remote memory 120 and 122 and/or the sub-nodes 108A-C can provide the nodes 102A-B with additional memory. The remote memory 120 and 122 and/or the sub-nodes can be exposed to the nodes 102, 103 locally, such as by a software protocol (e.g., a distributed file system, object map, or the like).

Each of the nodes 102, 108 is illustrated as including a plurality of hardware processors 110A and 110B communicatively connected via a link 112 and the NIC 114A. Each of the NICs 114A-D is communicatively coupled through the switch 104.

A caching agent is a coherency agent in a node that processes memory requests from the cores within the same node. A Home Agent (HA) is the node (e.g., node cluster) that is responsible for processing a memory request from a caching agent and acting as a home for part of the memory address space (note that one die (e.g., processor) can have multiple homes in a distributed address space mapping). Depending on the address space that a request is targeting, a request can go to the same node's local memory. Additionally, or alternatively, a memory request can go to an interface (e.g., a quick path interconnect (QPI)) to route the request to the other processors within the same coherent domain, or to processors outside the coherent domain, through the NIC. Sometimes a NIC is referred to as a host-fabric interface. All the processors connected on one side of the interface belong to the same coherent domain. Thus, the node 103 and 102 are part of the same coherent domain. The node 103 provides local memory for the node 102.

One system can include one or more coherent domains connected through a fabric interconnect (e.g., one or more of a fabric link, a fabric memory tunnel, and a switch). For example, high performance computing (HPC) or data centers can include N clusters or servers that can communicate with each other using the fabric interconnect. Using the fabric interconnect, each coherent domain can expose at least some address regions to other coherent domains. However, accesses between different coherent domains are not coherent, such as can include heterogeneous access latency times. Embodiments herein allow for reduction of the access latency times, such as by prefetcher at the NIC 114A-D.

A memory request can proceed as follows: (1) a node generates a memory request (e.g., a memory read or a memory write request); (2) the memory request is provided to a caching agent (CA), such as can be a processor or node-level CA; (3) the CA uses a system address decoder to decode that the memory request is homed to a memory location in a specific memory; (4) the system address decoder can return the address of the memory to which the request is homed; and (5) the memory request is forwarded to a memory controller of the memory to which the request is homed so that the memory request can be fulfilled. The fulfillment of the request can take more or less time depending on the type of memory being accessed, whether the memory is remote or local, and/or a bandwidth of a device between the requesting node and the node to which the request is homed.

Each of the nodes 102, 103 routes each of its remote memory requests through its own NIC 114A, 114B. The NIC 114A or 114B can implement a prefetching scheme, such as can be implemented by prefetcher circuitry of the NIC 114A (see FIGS. 2 and 3 for embodiments of prefetcher circuitry).

The switch 104 determines a node identification corresponding to the memory address that is the subject of the request (e.g., in response to detecting that no target identification or a specific target identification is specified). The switch 104 then generates another request (with the proper node identification) and forwards the request to the node that includes the corresponding address. The requested data (if a get request) or an acknowledgement (ACK) (if a put request) can then be routed back to the node that initiated the request, such as through one or more network interface controllers and/or switch(es). A not acknowledge (NACK) or error packet can be generated in the case of a failed get or put request.

A memory controller is a hardware, software, and/or firmware component that can initiate transactions with memory. A CA can retain one or more copies in a CA own cache structure. A caching agent can provide one or more copies of the coherent memory contents to other caching agents or other components, such as NICs, switches, routers, or the like. In performing a memory request, a core (e.g., a processor) sends a request to a caching agent. The caching agent determines if the address requested is cached in its LLC. If it's not cached in the LLC, then the caching agent sends the request to: (1) the local memory controller if the line is home in the memory of the local socket (the node of which the processor is a part) or (2) the NIC if the request is homed in the memory of a remote node. The remote node receiving the memory request will forward the request to the memory controller in the node.

The NIC 114A-D is a hardware component that connects a node to a network (e.g., the node 102 and 103 to the network(s) connected to the switch 104). The NIC 114A-D hosts circuitry to communicate using a specific standard (e.g., Ethernet, Wi-Fi, Internet Protocol (IP), cellular (e.g., Long Term Evolution (LTE), or the like). The NIC 114A-D allows nodes to communicate over wired or wireless connections therebetween. The NIC 114A-D can provide access to a physical layer and/or a data link layer, such as by providing physical access to a network medium and for addressing, such through media access control (MAC) addresses in the case of an Institute for Electrical and Electronics Engineers (IEEE) 802.11 network. The NIC 114A-D receives memory requests that are determined, by the system address decoders 218 (see FIG. 3), to be homed remotely. The NIC 114A-D provides such memory to the switch 104, such as with or without modification.

The switch 104 filters and forwards packets between networks (e.g., local area network (LAN) segments, LANs, and/or WANs). The switch 104 can operate at the data layer and/or the network layer. The switch 104 keeps a record of the addresses of devices connected to it. With this information, the switch 104 can identify which system is connected to which port. Therefore, when a memory request is received, the switch 104 can determine which port thereof to forward the request. Unlike a hub, a switch will allocate full bandwidth to each of its ports. So regardless of the number of nodes transmitting, users will always have access to the maximum amount of bandwidth. A hub however, allocates its bandwidth amongst all currently transmitting nodes so that when a single node is transmitting it gets the full bandwidth, but when multiple nodes are transmitting, each node only gets a portion of the full bandwidth. A switch transmits frames, where a router, as its name implies, is to route a request to other networks until that request ultimately reaches its destination.

The NIC 114C provides a request to the client server 106, which serves the request to the proper sub-node 108A-C. The server 106 provides resources to the sub-nodes 108A-C, which request services of the server 106. A response to the request from the sub-node 108A-C is provided back to the NIC 114C. The NIC 114C provides the response to the switch 104, which decodes the address to which the response is homed. The switch 104 then provides the response to the NIC 114A, which provides the response to the corresponding processor 110A-B.

Figure 2:
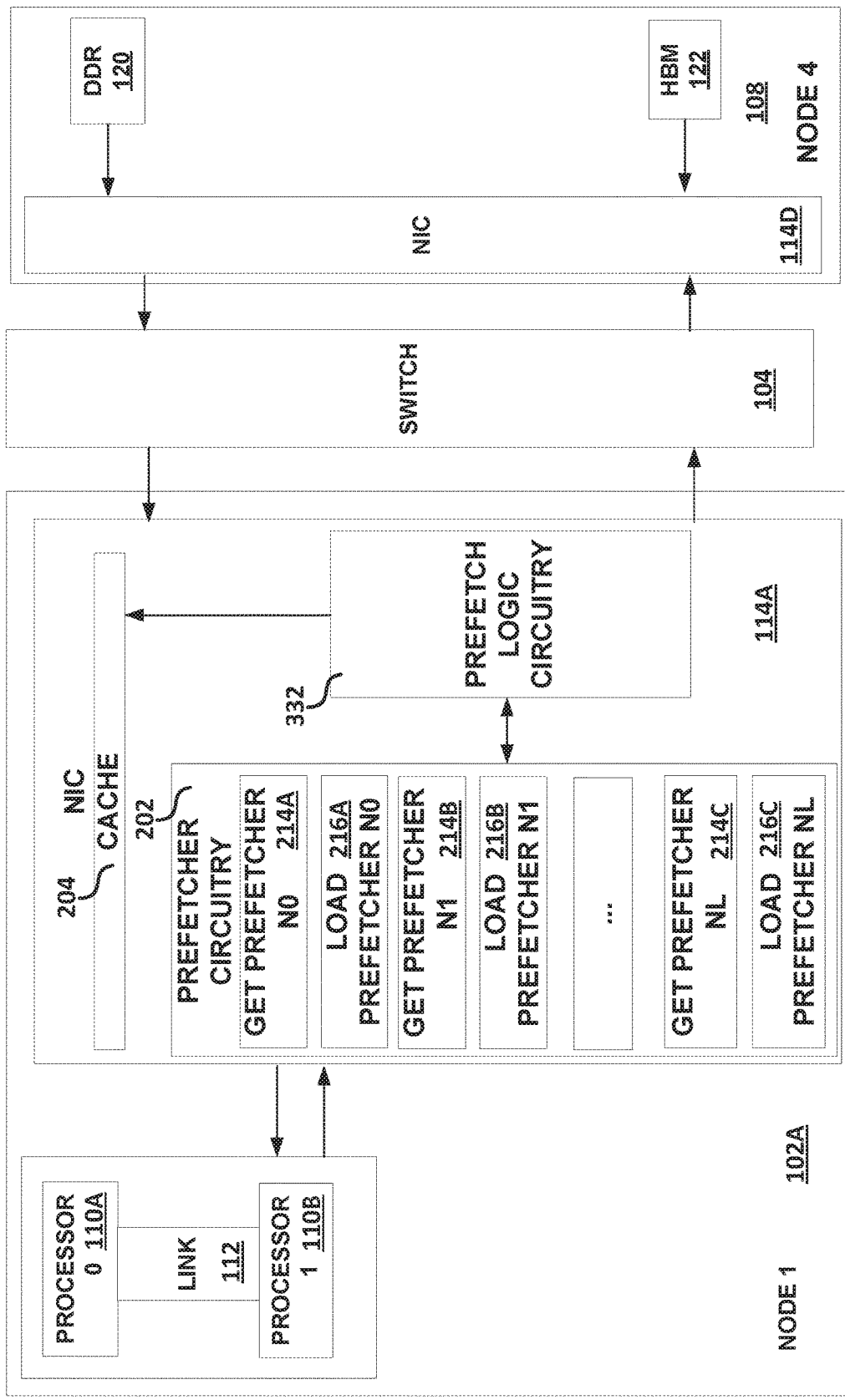
FIG. 2 illustrates, by way of example, an exploded view diagram of an embodiment of a portion of the system of FIG. 1.

FIG. 2 illustrates, by way of example, an exploded view diagram of an embodiment of a portion of the system of FIG. 1. The NIC 114A as illustrated includes a cache 204 (e.g., a level one (L1) cache), prefetcher circuitry 202, and system address decoder (SAD) circuitry 218.

The prefetcher circuitry 202, in one or more embodiments, can include get prefetchers 214A, 214B, and 2140, load prefetchers 216A, 216B, and 216C, and/or prefetcher logic circuitry 332. The prefetcher circuitry 202 can implement an address predictor (see FIG. 3). In one or more embodiments, a prefetcher can be implemented for each remote memory that can be accessed by the local node 102A. In one or more other embodiments, the NIC 114A can include fewer or more prefetchers than the number of remote memories which the local node 102A can access, such as can include a single, universal prefetcher, a prefetcher dedicated to two or more remote memories, or another configuration.

The prefetcher circuitry 202 can monitor requests issued by the node 102A. The prefetcher circuitry 202 can determine whether there are any patterns (e.g., repeated sequences of address requests) in the requests issued. Based on the determined patterns, the prefetcher circuitry 202 can issue one or more requests that preemptively retrieve data (e.g., before the node 102A produces a request for the data). The preemptively retrieved data can be stored in the cache 204, such as to reduce a latency realized in the node 102A accessing the data from the remote memory 120 and/or 122.

The SAD circuitry 218 (see FIG. 3) can include remote memory configuration data, such as stored on a memory of the SAD circuitry 218, and quality of service (QoS) monitoring circuitry. The SAD circuitry 218 can receive a request (e.g., a load, store, get, put, or other request) and determine a node address to which the request is homed. The SAD circuitry 218 can populate a cache 204 with results returned from requests.

The SAD circuitry 218 can determine whether a request is homed to an address that is not local (the request is homed to a remote node). This can be by determining that the address is not local (is not present in local memory and therefore is homed to a remote address) or determining that a characteristic of the request indicates that the memory request is a memory request for a remote address, such as a target identification in the request being blank or a specified value (of a specified range of values) (e.g., a maximum, minimum, or other value). In response to determining the request is homed to an address that is not local, the SAD circuitry 218 can forward the memory request to a NIC 114 that forwards the request to a switch 104 using a switch decode request. In one or more embodiments, the NIC 114 can modify the request before forwarding the request to the switch 104.

Each prefetcher (e.g., 214A-C and/or 216A-C) can predict and prefetch next data that a thread (e.g., a processor) will access (e.g., by a get or load request) in the remote memories which the corresponding prefetcher is dedicated to accessing. Each prefetcher, in one or more embodiments, can implement one or two different types of memory address prefetches: (1) prefetcher memory lines from remote memories based on memory references that an application running in the local node 104A has generated (e.g., load/store instructions), such as in embodiments in which the remote memory is tunneled over the fabric (e.g., the NIC and/or the switch) can be accessed by load and/or store instructions; (2) prefetcher memory lines from remote memories based on memory references that an application running on the local node has generated using put/get instructions. In one or more embodiments, both load/store instructions and get/put instructions can be handled by a same prefetcher.

Figure 3:
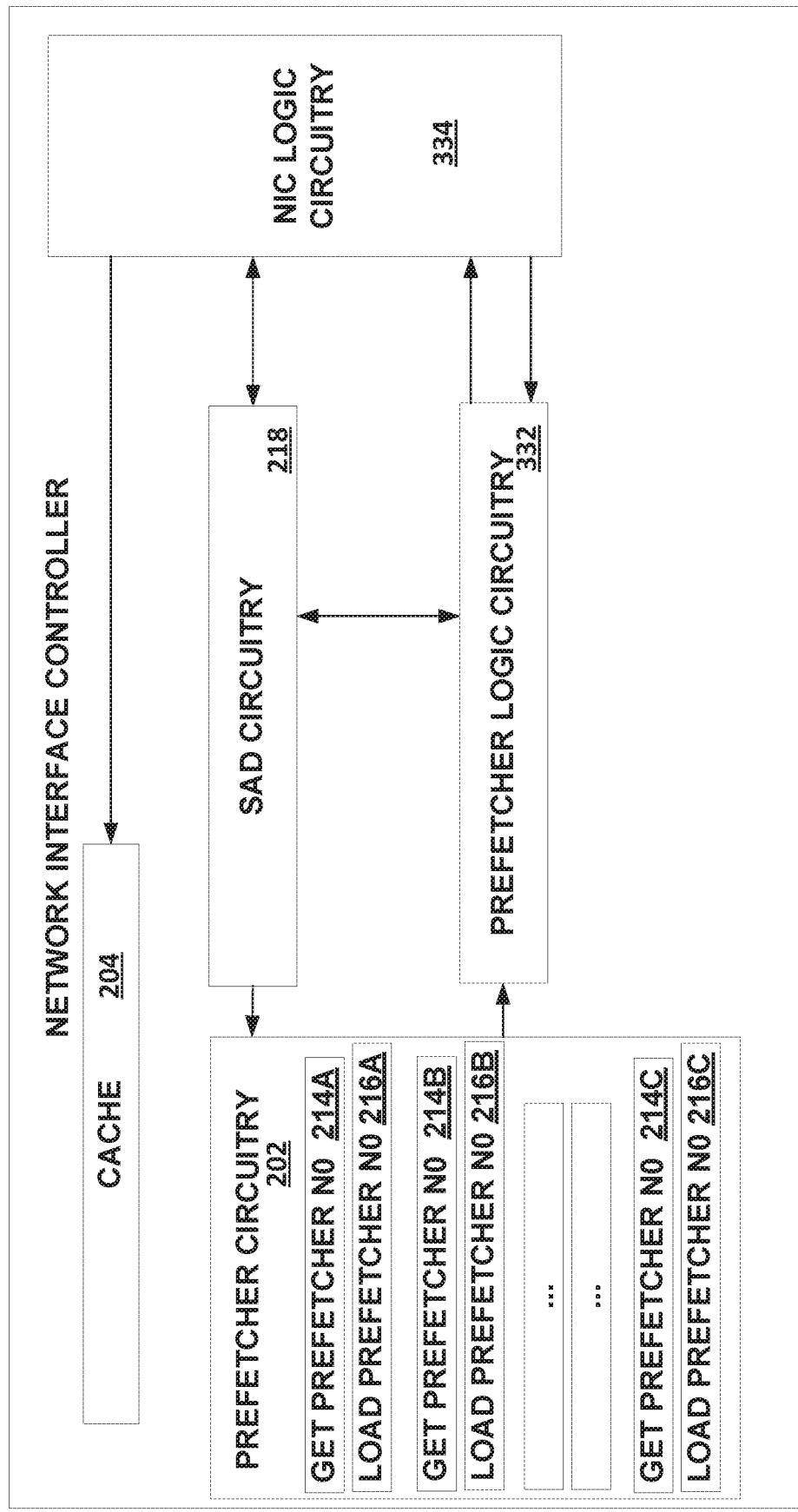
FIG. 3 illustrates, by way of example, an exploded view diagram of an embodiment of a NIC.

The system 200 (and other embodiments discussed herein) are compatible with existing SADs, such as can include existing SADs modified to include or be communicatively coupled to prefetcher circuitry, such as the Get prefetchers 214A-C, load prefetchers 216A-C, and/or prefetcher predictor circuitry (see FIG. 3). The SAD can return a memory type of the target node (e.g., the node to which a request is homed). The SAD can return a granularity with which data is to be prefetched (e.g., 32 bytes, 64 bytes, 128 bytes, 256 bytes, etc.). The SAD can control an injection rate (how aggressively the prefetcher retrieves data from the remote memory). The parameters (e.g., the injection rate and the granularity, among others) can be configured at boot time in each of the NICs 114. The granularity and/or the injection rate can help maintain a quality of service (QoS) provided by the DSM system 200. In one or more embodiments, a higher injection rate can be used for an HBM, and a lower injection rate can be used for a lower bandwidth memory (as compared to the HBM) or a memory that is more critical to the system. The injection rate can be based on a prefetch distance (e.g., how far ahead of the current request will the prefetcher act) and prefetch degree (e.g., how many prefetches will be executed per request). Note that a request is a load, store, put, get, or other like operation. Prefetcher can tie up a memory by performing too many accesses, not leaving the memory available for access by other resources of the system.

In one or more embodiments, a remote node (e.g., a remote memory controller or a server) can provide an indication to prefetchers of the system 100 that causes the prefetchers to adjust their injection rate. The remote node can detect that the remote memory is not able to keep up with the current demand, and in response, can provide the indication to one or more of the prefetchers that is accessing the remote memory. The prefetcher can then reduce the injection rate (or stop prefetcher), such as to help reduce the demand on the remote memory. The injection rate can also be set based on historical usage of a remote memory.

The prefetcher can implement a prefetching scheme, such as can include a cache block, a nonblocking load, hardware-controlled prefetcher, and/or software-controlled prefetcher. In one or more embodiments, each of the prefetchers can implement a same prefetching scheme or one or more prefetchers can implement a different prefetching scheme than another prefetcher. Prefetching is useful if an address that an application will access can be determined ahead of time. Some applications may include an access that is non-deterministic (e.g., unpredictable). Prefetcher can be done by hardware, a compiler, and/or a programmer. In one or more embodiments, the prefetched data can be stored in a cache used by the application (e.g., the L1 cache) or a dedicated prefetcher cache. Storing the prefetched data in the cache is simpler to implement, but can lead to cache pollution.

In a hardware prefetcher, the prefetcher logic circuitry 332 (see FIGS. 2 and 3) monitors processor accesses, determines patterns/strides, and generates (e.g., automatically) prefetch addresses. In execution-based prefetcher (e.g., software pre-fetching) a thread is executed to prefetch data for an application. The thread, or prefetch access order or predictor, can be generated by a programmer or by the hardware.

Some hardware prefetching schemes includes always prefetching N addresses after an access operation. This scheme is simple and works well with sequential access patterns, but does not work well with non-sequential access patterns. Another hardware prefetching scheme includes a stride prefetcher (e.g., an instruction program counter or cache block address based prefetcher). In a stride prefetcher, a distance between memory addresses referenced by a load or get instruction (e.g., a stride of the instruction) as well as the last address referenced by the load or get. The next time the same address is fetched, the last address plus the stride, plus other addresses, can be prefetched.

Another hardware prefetching scheme includes a stream buffer prefetcher. In stream buffer prefetcher, each stream buffer holds a stream of prefetched cache lines. On a load, an entry of all stream buffers can be checked for an address match. If there is a match, the cache can be updated. If no match, the stream buffer(s) can be updated to include new data, such as based on stride prediction.

Other prefetching schemes include correlation based prefetchers (e.g., Markov prefetcher), content directed prefetcher, and hybrid hardware prefetcher. In Markov prefetcher, a likelihood of next N addresses is determined based on a request for an address. Then, a number of addresses can be prefetched based on the determined likelihood. Content directed prefetcher is a specialized sort of prefetcher for pointer values that can identify pointers among values in a fetched cache and issue prefetch request for the pointer values. To determine if an address is a pointer, some most significant bits of a prefetched value can be compared to requested address values. If the most significant bits match, it is likely that it is a pointer and not a value. Hybrid hardware prefetcher uses a combination of one or more of the prefetcher discussed or other prefetching scheme.

Note that while some prefetching schemes are discussed, the embodiments are not limited to only those discussed schemes. The embodiments discussed are generally agnostic to which prefetching scheme is used and different prefetching schemes can be better suited for different programs, such as is previously discussed.

The SAD circuitry 218 can be configured to specify that all the remote memory is homed by the local NIC 114. All requests targeting non-local address space can be sent to the NIC 114.

FIG. 3 illustrates, by way of example, an exploded view diagram of an embodiment of a NIC 114. The NIC 114A-D can be configured like the NIC 114, such as to include one or more of the components of the NIC 114 or perform one or more of the operations of the NIC 114. The NIC 114 is illustrated as including a cache 204, prefetcher circuitry 202, SAD circuitry 218, prefetcher logic circuitry 332, and NIC logic circuitry 334. The cache 204 is a memory. Caches are typically configured for high speed access (in terms of location to processors and also in terms of read and/or write speed).

The load prefetchers 216A-C and the get prefetchers 214A-C prefetch data from one or more nodes and/or one or more memory types. For example, a node with three memory types can have three separate prefetchers dedicated to retrieving data therefrom, on for each memory type. If the number of nodes and/or memory types is more than the number of load prefetchers 216A-C and/or get prefetchers 214A-C, one or more of the load prefetchers 216A-C and get prefetchers 214A-C can perform prefetch operations for more than one node and/or memory type. A prefetch operation is a memory retrieval that is not initiated by a processor running the application for which the memory retrieval is used. A prefetch operation is initiated by other circuitry on behalf of the processor. In one or more embodiments, load prefetchers 216A-C prefetch memory addresses for streams of memory accesses generated by/for the DSM system. In one or more embodiments, get prefetchers 214A-C prefetch memory addresses for streams of memory accesses using a get/put fabric, such as can include a non-DSM architecture).

The load prefetchers 216A-C are provided addresses associated with load requests issued to a node and/or memory for which the load prefetcher 216A-C is responsible for prefetcher data. The get prefetchers 214A-C are provided addresses associated with load requests issued to a node and/or memory for which the get prefetcher 214A-C is responsible for prefetcher data. Each of the load prefetchers 216A-C and get prefetchers 214A-C predict a next address or future address that will be requested form the node and/or memory based on the provided addresses. The address provided to the load prefetchers 216A-C and the get prefetchers 214A-C can be provided by the prefetcher logic circuitry 332. The load prefetchers 216A-C and the get prefetchers 214A-C can use a prefetch scheme, such as one discussed herein, to determine which address(es) from which to prefetch data. In one or more embodiments, the load prefetchers 216A-C and/or get prefetchers 214A-C only predict a specified number of next addresses from which the node will request data.

The prefetcher logic circuitry 332 provides the load prefetchers 216A-C and/or the get prefetchers 214A-C with address(es) that the corresponding load prefetchers 216A-C and/or get prefetchers 214A-C can use to perform a next address prediction. The addresses provided to the load prefetchers 216A-C and/or get prefetchers 214A-C can be received from one or more of the processors 110A-B (connection between the processors 110A-B and the prefetcher logic circuitry 332 is not illustrated in FIG. 3). The prefetcher logic circuitry 332 can determine to which node and/or memory the addresses received from the processors 110A-B are homed, such as by providing a request to the SAD circuitry 218. The SAD circuitry 218 can include data indicating prefetcher parameters for each of the nodes and/or memories remote to the node.

The prefetcher logic circuitry 332 can retrieve a next one or more addresses to be prefetched from the load prefetcher 216A-C and/or get prefetcher 214A-C. The SAD circuitry 218 can determine whether the node and/or memory allows prefetcher, the distance to the node and/or memory, and/or a granularity of data to be prefetched. If there is no mapping for the address to be prefetched, such as in the SAD circuitry 218, no action may be performed with regard to prefetcher based on that address.

Based on the parameters provided to the prefetcher logic circuitry 332 by the SAD circuitry 218, the prefetcher logic circuitry can issue a get request to one or more remote nodes for a specific amount of data (e.g., as indicated by the granularity parameter) from a node and/or memory (e.g., as indicated by a node identification or memory identification). The request can include a bit that indicates whether or not the request is associated with a prefetch. The target NIC can proceed to process the prefetch get request, such as can include prioritizing non-prefetch requests over prefetch requests (e.g., as indicated by the bit that indicates whether or not the request is associated with a prefetch or whether or not the bit that indicates whether or not the request is associated with the prefetch is present in the request). A request that does not include the bit that indicates whether or not the request is associated with a prefetch (such as can be from a legacy device) can be assumed to not be associated with a prefetch request. The target NIC can, in one or more embodiments, set one or more bits, in the response to the request, that indicates whether or not to increase or decrease a number of prefetches to the node and/or memory. For example, a "0" can indicate to decrease prefetcher, a "1" can indicate to increase prefetcher, and a no value "NV" can indicate too keep the prefetcher where it is (no change). The target NIC can set the bit to "0" in response to determining a load level on the node or memory is greater than a specified threshold value, such as can be set based on an amount of traffic that the target node and/or memory can reliably service, such as without fault or traffic jamming.

The SAD circuitry 218 can, in response to determining a specified time has elapsed since receiving a bit indicating to reduce or increase the prefetcher on a specified node and/or memory, return a parameter value to a default value. For example, if the SAD circuitry 218 reduces an injection rate from a first value to second value based on the bit from the target NIC being "0", the SAD circuitry 218 can return the bit to the first value after a specified amount of time elapsing without and adjustment to the injection rate. The specified time can be implemented using a machine specific register (MSR) or the like.

The NIC logic circuitry 334 provides communications to a switch (e.g., the fabric) that are forwarded to remote nodes. The NIC logic circuitry 334 formats the communications from the prefetcher logic circuitry 332 into a format compatible with the fabric. The NIC logic circuitry 334 can receive feedback from a remote NIC, node, and/or memory controller. The feedback can be provided to the SAD circuitry 218, and the SAD circuitry can update the parameters associated with prefetcher from the node and/or memory based on the feedback. For example, if the feedback indicates that there is too much traffic and too much bandwidth is being used at the memory, such as by prefetcher, an injection rate associated with prefetcher from that node and/or memory can be decreased.

Figure 4:
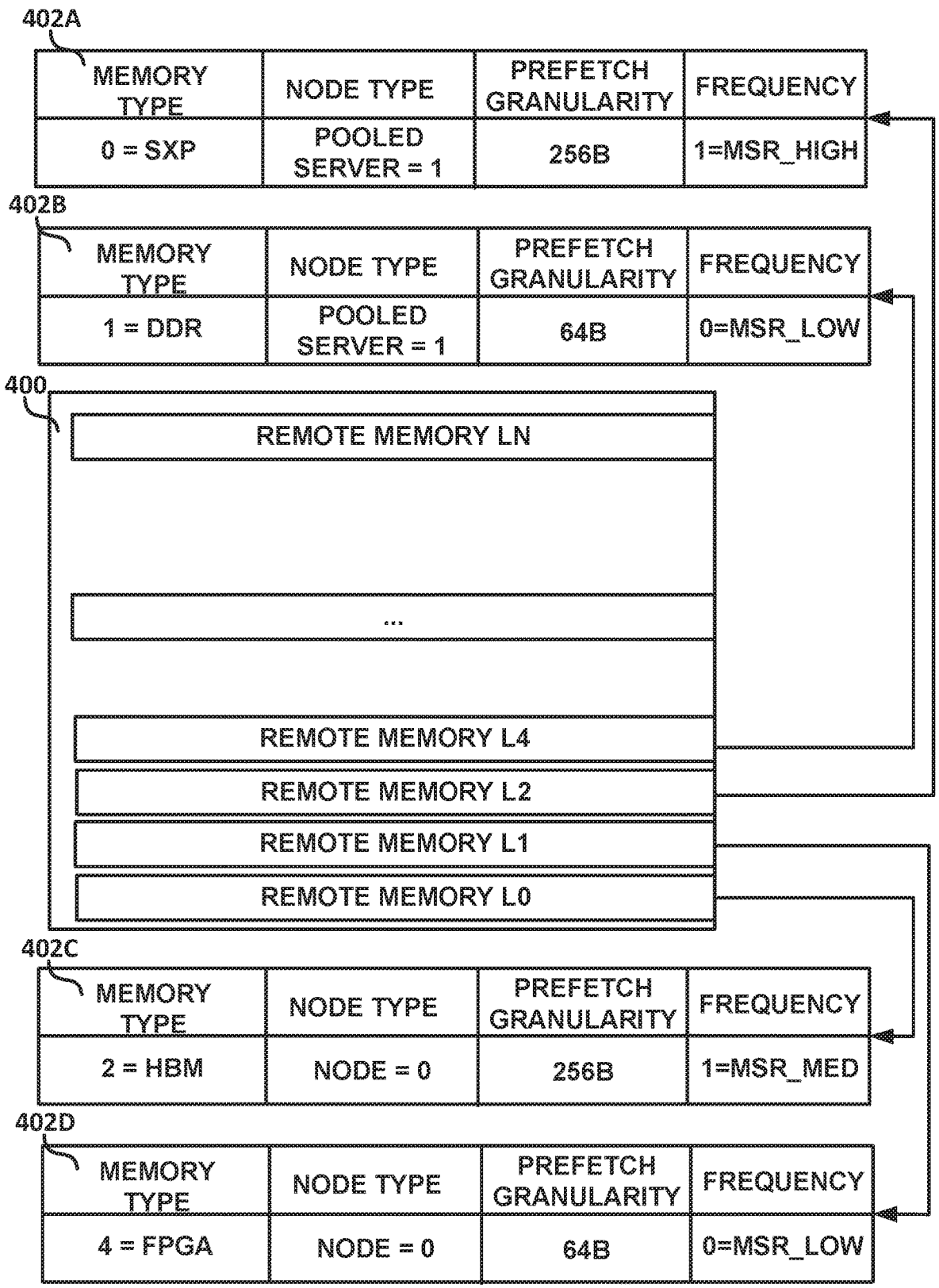
FIG. 4 illustrates, by way of example, a diagram of an embodiment of a memory structure.

The SAD circuitry 218 controls from which nodes and/or memories prefetcher can be performed and parameters by which the prefetcher is performed. The NIC 114 can include a memory, such as can be part of the circuitry of the NIC 114, that details which nodes and/or memories allow prefetcher and parameters by which the prefetcher can be performed. FIG. 4 illustrates, by way of example, an embodiment of a memory structure 400 that provides such information. Each of the address ranges of a thread run in the local node that refers to a remote memory can be associated with one or more of the load and/or get prefetchers. Per each of the N remote memories, the local memory can specify whether prefetcher is allowed (e.g., by setting a prefetcher granularity to "0" to indicate that prefetcher is not allowed or a positive value (e.g., 32, 64, 128, 256, etc.) to indicate that prefetcher is allowed). Per each of the N remote memories, the local memory can specify an injection rate (e.g., a frequency) with which prefetcher is performed.

Figure 5:
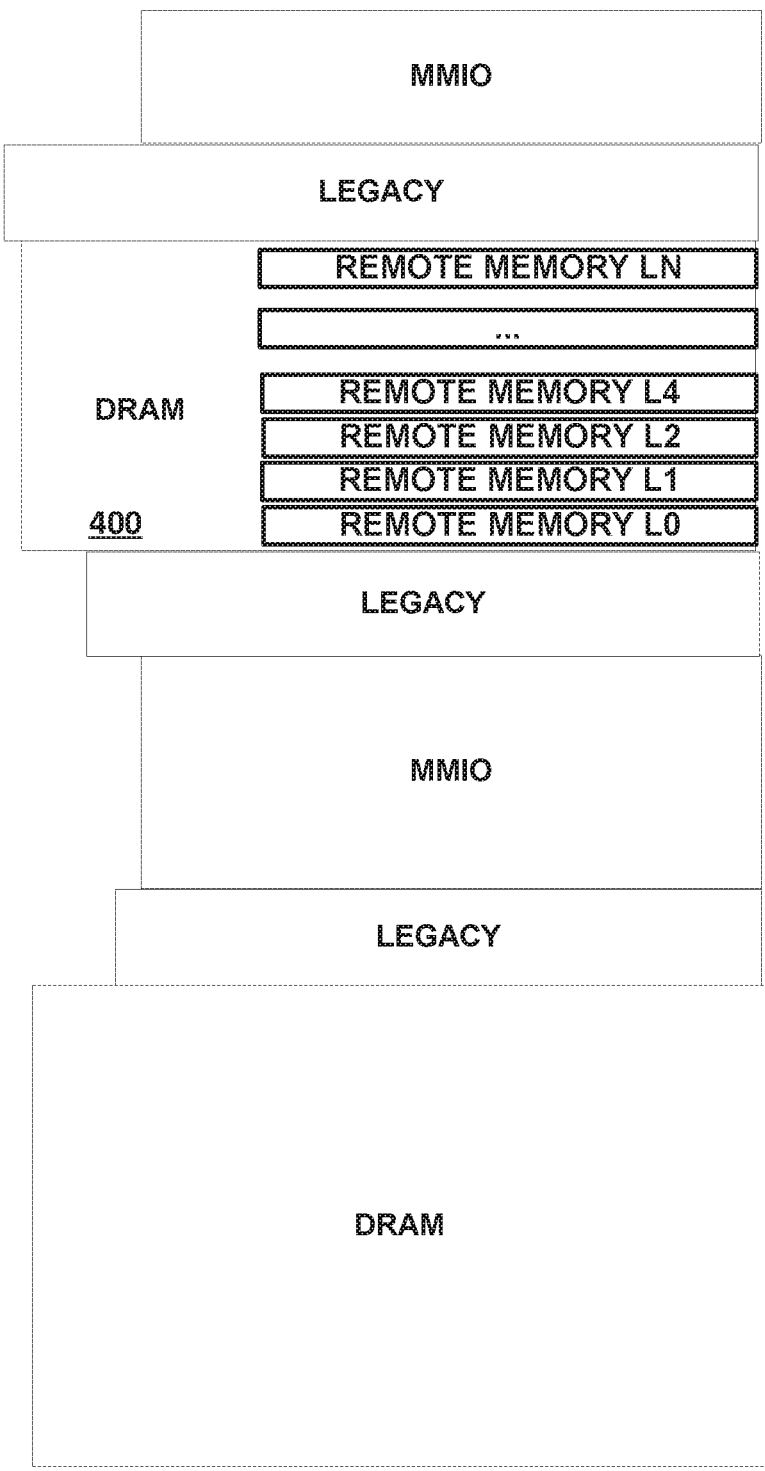
FIG. 5 illustrates, by way of example, a diagram of an embodiment of a memory structure.

The memory structure 400 as illustrated includes a plurality of memory entries 402A, 402B, 402C, and 402D. Each of the entries can include information indicating a memory type, a node type, a prefetch granularity, and a frequency. The memory structure 400 can be a part of the SAD circuitry 218. In one or more embodiments, the memory structure 400 can reside in a dynamic random access memory (DRAM) portion of the memory structure 400, such as shown in FIG. 5. Note that the labels "Remote Memory L0" and the like are representative of node and/or memory identifications, such as can include an address of the node and/or memory.

FIG. 5 illustrates, by way of example, a diagram of an embodiment of a memory 500 that includes the memory structure 400. The memory 500 as illustrated includes DRAM (dynamic random access memory), memory-mapped I/O (Input/Output), and legacy memory. Note that the layout of the memory is implementation specific. The memory structure 400 can include the memory space that includes the prefetcher parameters as previously discussed.

In one or more embodiments, the DRAM can include space for legacy I/O, such as an Industry Standard Architecture (ISA) bus, PAM graphics, and/or Video Graphics Array (VGA) slots, among others. In one or more embodiments, the DRAM can include MeSeg or TSeg stolen memory.

In one or more embodiments, feedback from a remote node can indicate that the QoS provided by the node and/or memory is dropping. The SAD circuitry 218, in response to receiving this feedback, can reduce the frequency and/or the prefetch granularity, such as to reduce an overall load on the remote node and/or memory.

Figure 6:
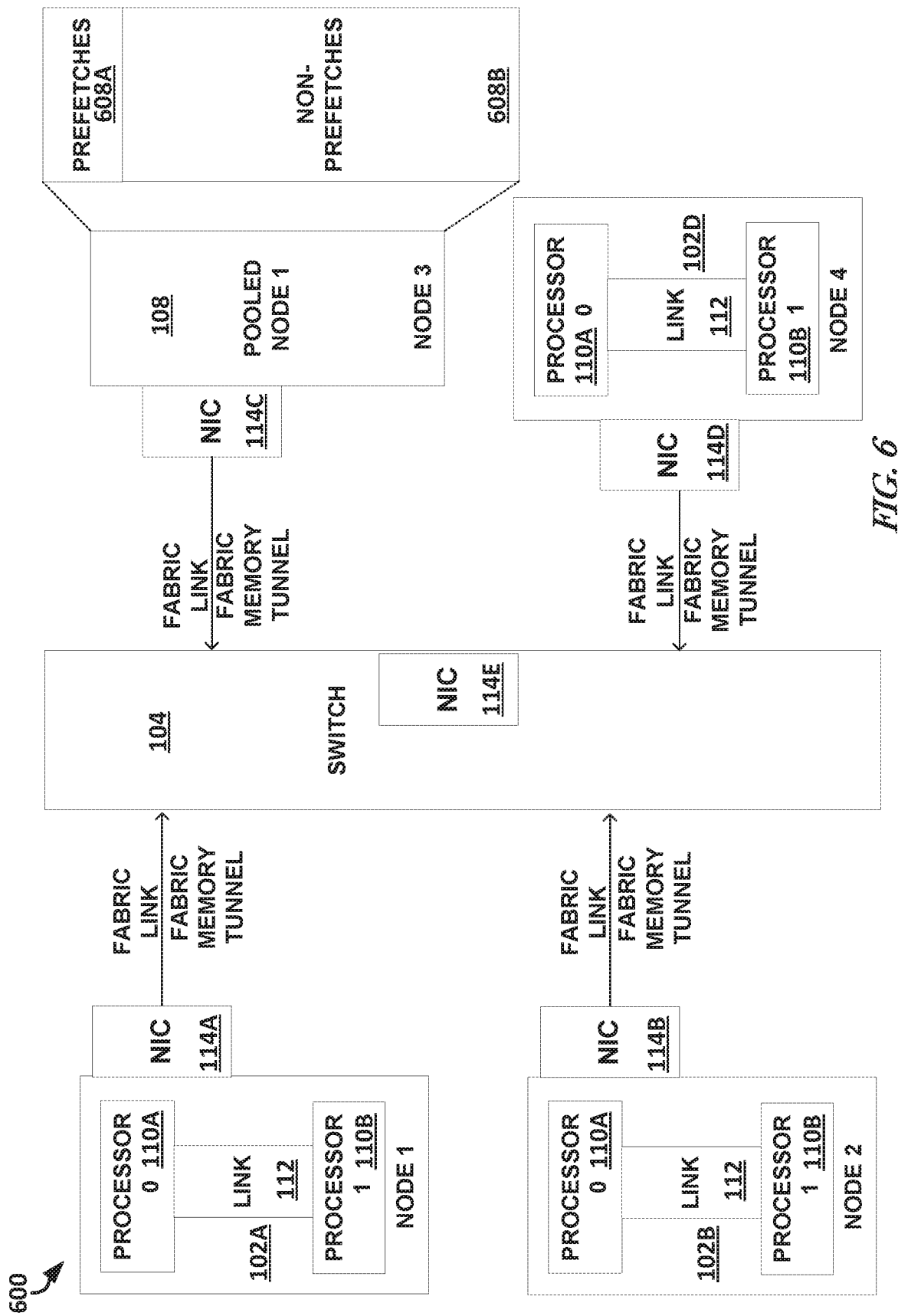
FIG. 6 illustrates, by way of example, a logical block diagram of an embodiment of a DSM system.

FIG. 6 illustrates, by way of example, a logical block diagram of an embodiment of a system 600 that includes an overloaded node (e.g., the client server 106). The server 106 can keep track of how many prefetch and non-prefetch requests it services in a specified amount of time (indicated by 608A and 608B). The server 106 can compare the number of total requests serviced to a threshold value (e.g., the bandwidth of the remote node and/or memory, such as can be determined empirically, looked up, provided by a manufacturer, or otherwise provided or determined). If greater than the threshold value, the server 106 can indicate that the injection rate and/or granularity is to be reduced, such as by setting one or more bits in a reply to a prefetcher request to a specified value. If less than the threshold value, the server 106 can indicate that the injection rate and/or granularity is to be increased. Consider an example in which the frequency (see FIG. 4) is set to a lowest possible value and the prefetch granularity is set to 64 bits for a remote node. The SAD circuitry 218 then receives feedback from the node indicating that prefetcher from the node is to be reduced, such as to preserve QoS. The SAD circuitry 218 can, in response to receiving the feedback, set the corresponding granularity to "0", thus preventing prefetcher from that node.

Communication Flow

Figure 7:
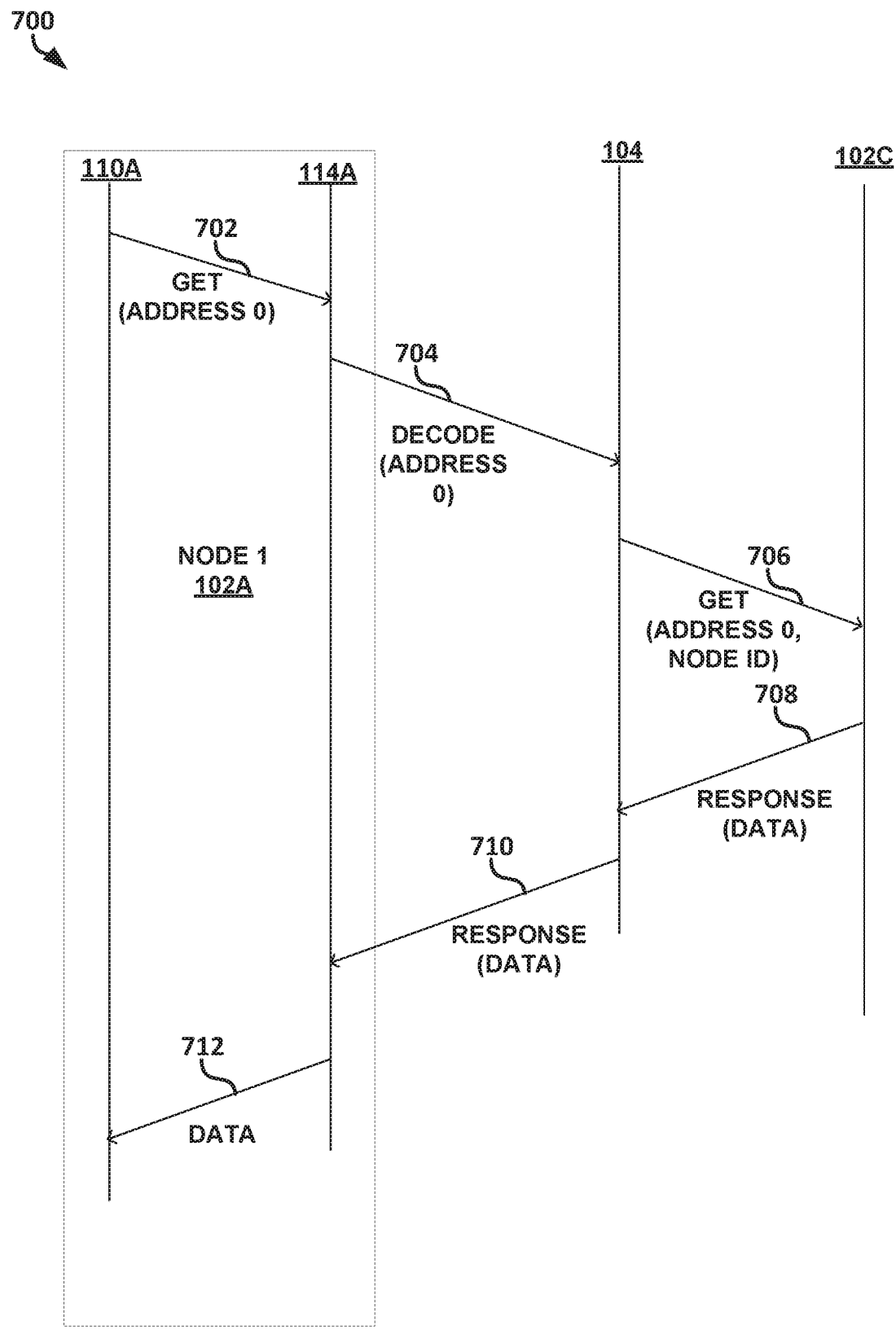
FIG. 7 illustrates, by way of example, a flow diagram of an embodiment of communications to implement a non-prefetching data retrieval in a multi-tiered memory system.

FIG. 7 illustrates, by way of example, a flow diagram of an embodiment of communications 700 for non-prefetch retrieving data from a remote address ("address 0"). The communications 700 as illustrated include a get(address) request 702 from the processor 110A to the NIC 114A of the node 102A. The get(address) request 702 is one or more packets from the processor 110A that specifies an address from which to retrieve data. The packet can include a destination node id that is blank or set to a specified value (of a range of specified values). The get(address) request 802 can be provided in response to SAD circuitry of the node 102A determining that the request is homed to a remote node.

The communications 700 further include a decode(address) request 704 from the NIC 114A to the switch 104. The decode(address) request 704 can be forwarded to the switch 104. The switch 104 can determine a port thereof to which to forward the get(address) request.

The communications 700 further include a get(address, node ID) request 706 to the corresponding node, in this example the node 102C. The node 102C receives the request and provides a response(data) 708. The response(data) can include an acknowledge, an error indicator (e.g., not acknowledged), and/or data. The response(data) 710 can be provided to the node 102A (e.g., the NIC 114A of the node 102A). The data 712 from the response can be provided to the processor 110A that requested the data.

Figure 8:
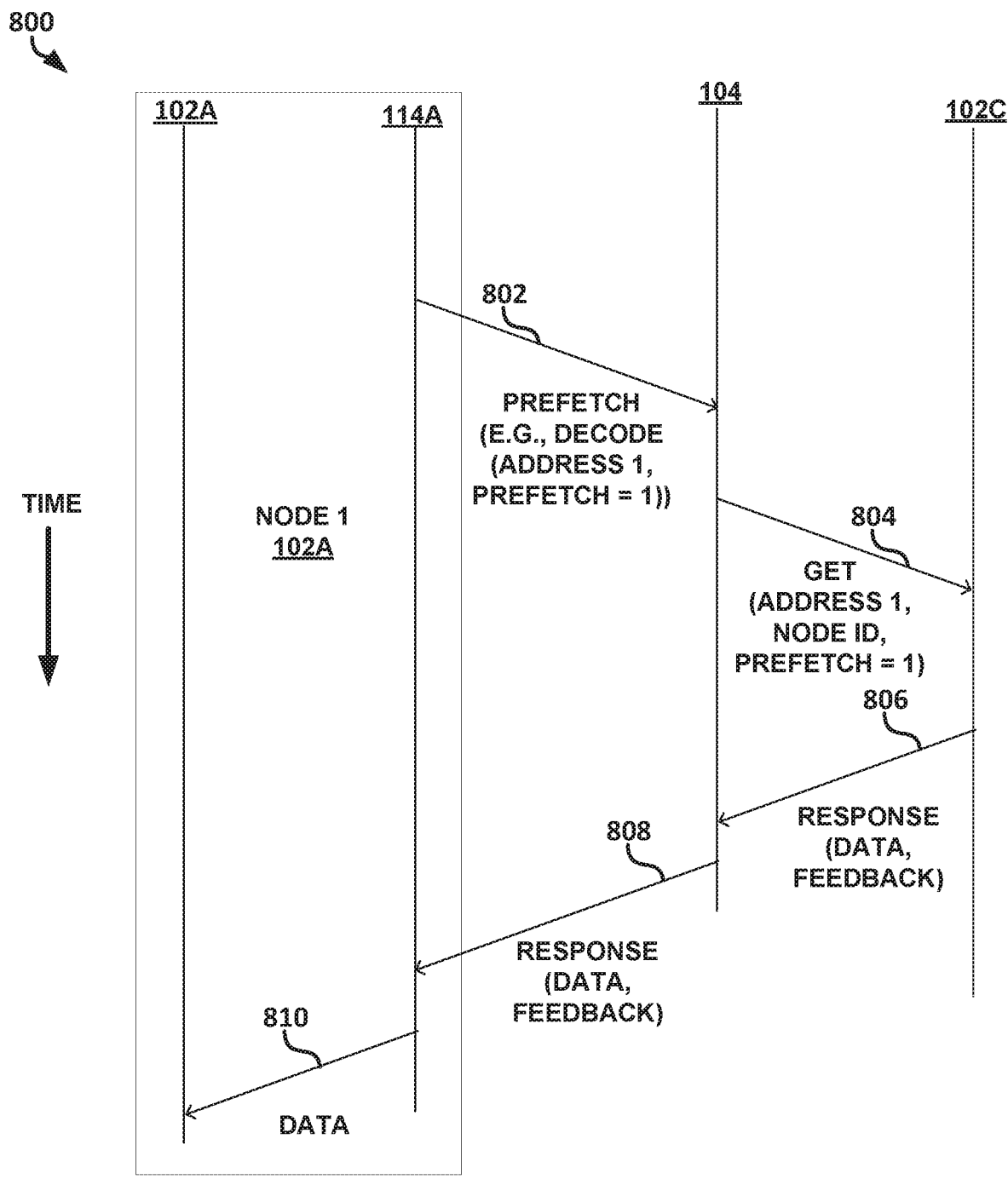
FIG. 8 illustrates, by way of example, a flow diagram of an embodiment of communications to implement a prefetching data retrieval in a multi-tiered memory system.

FIG. 8 illustrates, by way of example, a flow diagram of an embodiment of communications 700 for pre-fetching data from a remote address ("address 1"). In response to receiving the request 702, the NIC 114A can determine which address(es) the processor 110A is likely to request data from next. The NIC 114A can issue a prefetch request 802. The prefetch request 802 can indicate that the request is a prefetch (e.g., by setting a prefetch bit to a specified value (in this example "1")), and which address(es) are to be prefetched ("address 1"). The switch 104 can determine which node the address is homed to and generate a get (address, node ID, prefetch) request 804, where the node ID is the identification of the node to which the request is homed.

The node 102C can respond to the request 804 with a response(data, feedback) 806. The data can be from the address(es) specified in the request 804. The feedback can indicate whether to increase, decrease, stop, or keep constant the current amount of prefetcher from the node 1020, such as previously discussed. A response(data, feedback) 808 can be provided to the NIC 114A. The NIC 114A can update one or more entries in a memory thereof to reflect changes indicated by the feedback. Data 810 from the response 808 can be provided to the processor 110A.

Some differences between a prefetch data request communication flow (e.g., shown in FIG. 8) and a non-prefetch data request communication flow (e.g., shown in FIG. 7) can include one or more of: (1) the non-prefetch data request originates with the processor 110A, while the prefetch data request originates with the NIC 114A; (2) the prefetch data request can include a bit indicating that the request is associated with data being prefetched; and (3) a response to a prefetch data request can include feedback that can be used to adjust the prefetch scheme, such as to help ensure QoS.

Circuitry of the NIC 114 can be exposed to one or more process monitors (PMONS) or data created by the one or more PMONS. The PMONS can reside locally or remotely. The PMONS can monitor and compile statistics related to prefetching latency, number of prefetches, number of prefetches used by a processor, or the like. The PMONS can provide data that helps determine which of the prefetcher circuitry 202 is useful, such as to allow the prefetcher circuitry to continue operating. A PMON can monitor the QoS, such as to determine whether and/or what value to set the feedback bits too (see FIG. 8).

Figure 9:
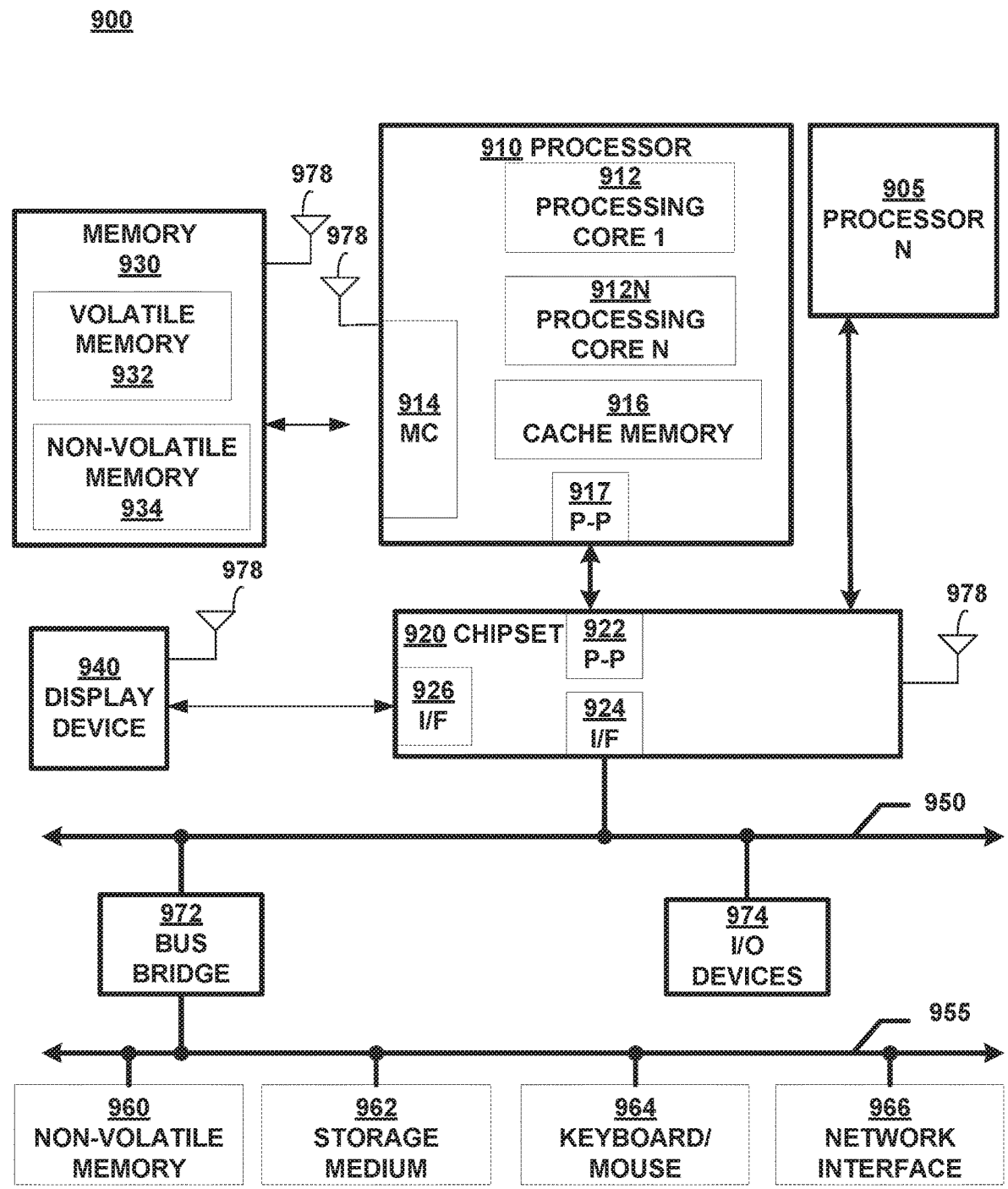
FIG. 9 illustrates, by way of example, a logical block diagram of an embodiment of a system.

FIG. 9 illustrates, by way of example, a logical block diagram of an embodiment of a system 900. In one or more embodiments, the system 900 includes one or more components that can be included in the node 102A-D, 103, NIC 114A-D, switch 104, client server 106, sub-node 108A-C, SAD circuitry 218, cache 204, prefetcher circuitry 202, prefetcher logic circuitry 332, and/or NIC logic circuitry 334.

In one embodiment, processor 910 has one or more processing cores 912 and 912N, where 912N represents the Nth processing core inside processor 910 where N is a positive integer. In one embodiment, system 900 includes multiple processors including 910 and 905, where processor 905 has logic similar or identical to the logic of processor 910. In some embodiments, processing core 912 includes, but is not limited to, pre-fetch logic to fetch instructions, decode logic to decode the instructions, execution logic to execute instructions and the like in some embodiments, processor 910 has a cache memory 916 to cache instructions and/or data for system 900. Cache memory 916 may be organized into a hierarchical structure including one or more levels of cache memory.

In some embodiments, processor 910 includes a memory controller 914, which is operable to perform functions that enable the processor 910 to access and communicate with memory 930 that includes a volatile memory 932 and/or a non-volatile memory 934. In some embodiments, processor 910 is coupled with memory 930 and chipset 920. Processor 910 may also be coupled to a wireless antenna 978 to communicate with any device configured to transmit and/or receive wireless signals. In one embodiment, the wireless antenna interface 978 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 934 includes, but is not limited to, flash memory, phase change memory (PCM), read-only memory (ROM), electrically erasable programmable read-only memory (EEPROM), or any other type of non-volatile memory device.

Memory 930 stores information and instructions to be executed by processor 910. In one embodiment, memory 930 may also store temporary variables or other intermediate information while processor 910 is executing instructions. The memory 930 is an example of a machine-readable medium. While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions for execution by a machine (e.g., the NIC 114 or any other device) and that cause the machine to perform any one or more of the techniques of the present disclosure, or that is capable of storing, encoding or carrying data structures used by or associated with such instructions. In other words, the various circuitry discussed herein can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In the illustrated embodiment, chipset 920 connects with processor 910 via Point-to-Point (PtP or P-P) interfaces 917 and 922. Chipset 920 enables processor 910 to connect to other elements in system 900. In some embodiments of the invention, interfaces 917 and 922 operate in accordance with a PtP communication protocol such as the Intel® QuickPath Interconnect (CPI) or the like. In other embodiments, a different interconnect may be used.

In some embodiments, chipset 920 is operable to communicate with processor 910, 905N, display device 940, and other devices. Chipset 920 may also be coupled to a wireless antenna 978 to communicate with any device configured to transmit and/or receive wireless signals.

Chipset 920 connects to display device 940 via interface 926. Display device 940 may be, for example, a liquid crystal display (LCD), a plasma display, cathode ray tube (CRT) display, or any other form of visual display device. In some embodiments of the invention, processor 910 and chipset 920 are merged into a single SOC. In addition, chipset 920 connects to one or more buses 950 and 955 that interconnect various elements 974, 960, 962, 964, and 966. Buses 950 and 955 may be interconnected together via a bus bridge 972. In one embodiment, chipset 920 couples with a non-volatile memory 960, a mass storage device(s) 962, a keyboard/mouse 964, and a network interface 966 via interface 924 and/or 904, etc.

In one embodiment, mass storage device 962 includes, but is not limited to, a solid state drive, a hard disk drive, a universal serial bus flash memory drive, or any other form of computer data storage medium. In one embodiment, network interface 966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the components shown in FIG. 9 are depicted as separate blocks within the system 900, the functions performed by some of these blocks may be integrated within a single semiconductor circuit or may be implemented using two or more separate integrated circuits. For example, although cache memory 916 is depicted as a separate block within processor 910, cache memory 916 (or selected aspects of 916) can be incorporated into processor core 912.

Examples and Notes

The present subject matter may be described by way of several examples. Example 1 can include a network interface controller (NIC) comprising system address decoder (SAD) circuitry configured to determine a node identification of a node to which a memory request from a processor is homed input/output (I/O) circuitry to receive, from system address decoder (SAD) circuitry, a node identification of a node to which a memory request from a processor is homed, and prefetcher circuitry communicatively coupled to the SAD circuitry, the prefetcher circuitry to determine, based on an address in the memory request, one or more addresses from which to prefetch data, the one or more addresses corresponding to respective entries in a memory of a node on a different network than the NIC In Example 2, Example 1 can further include, wherein the prefetcher circuitry includes a plurality of prefetcher circuits each dedicated to predicting a next one or more addresses of a respective memory to be accessed by the processor.

In Example 3, at least one of Examples 1-2 can further include, wherein the prefetcher circuitry includes first prefetcher circuitry to monitor only load requests from the processor and determine an address associated with a next load request from the processor and second prefetcher circuitry to monitor only get requests from the processor and determine an address associated with a next get request from the processor.

In Example 4, at least one of Examples 1-3 can further include NIC logic circuitry configured to add one or more bits to a decode request indicating whether or not the decode request is associated with a prefetch operation.

In Example 5, at least one of Examples 1-4 can further include, wherein the SAD circuitry includes a memory with a plurality of entries to indicate one or more of a memory type, an injection rate, and a granularity of a prefetching scheme to be used with a memory associated with a respective entry of the plurality of entries.

In Example 6, Example 5 can further include, wherein the SAD circuitry is further configured to adjust one or more of the injection rate and the granularity in response to feedback from the node on the different network.

In Example 7, Example 6 can further include, wherein the feedback includes one or more bits indicating whether to increase, decrease, or keep constant one or more of the injection rate and the granularity.

In Example 8, at least one of Examples 1-7 can further include, wherein the prefetcher circuitry includes first prefetcher circuitry configured to implement a first prefetching scheme and second prefetcher circuitry configured to implement a second, different prefetching scheme.

Example 9 can include a non-transitory machine-readable medium including instructions stored thereon that, when executed by a network interface controller (NIC), configure the NIC to receive, from a processor, a plurality of requests for data on a different network than the processor, determine, based on a plurality of addresses of the plurality of requests, one or more addresses from which to prefetch data from the different network for the processor, issue a prefetch request for data from the determined one or more next addresses, and provide, to the processor, the data corresponding to the prefetch request.

In Example 10, Example 9 can further include instructions that, when executed by the NIC, configure the NIC to monitor, using first instructions of the instructions, only load requests from the processor, determine, using the first instructions, an address associated with a next load request from the processor, monitor, using second instructions of the instructions, only get requests from the processor, and determine, using the second instructions, an address associated with a next get request from the processor.

In Example 11, at least one of Examples 9-10 can further include instructions that, when executed by the NIC, configure the NIC to add one or more bits to a decode request indicating whether or not the decode request is associated with a prefetch operation.

In Example 12, at least one of Examples 9-11 can further include instructions that, when executed by the NIC, configure the NIC to adjust one or more of an injection rate and a granularity value stored in a memory in response to feedback from the node on the different network.

In Example 13, Example 12 can further include, wherein the feedback includes one or more bits indicating whether to increase, decrease, or keep constant one or more of the injection rate and the granularity value.

Example 14 can include a system operating in a computer network, the system comprising a plurality of communicatively coupled nodes, each including a network interface controller (NIC) coupled to a plurality of processors, each NIC comprising a system address decoder (SAD) circuitry configured to determine a node identification of a node to which a memory request from a processor is homed, and prefetcher circuitry communicatively coupled to the SAD circuitry, the prefetcher circuitry to determine one or more addresses from which to prefetch data, the one or more addresses corresponding to respective entries in a memory of a node on a different network than the computer network.

In Example 15, Example 14 can further include, wherein the prefetcher circuitry includes a plurality of prefetcher circuits each dedicated to predicting a next one or more addresses of a respective memory to be accessed by the processor.

In Example 16, at least one of Examples 14-15 can further include, wherein the prefetcher circuitry includes a plurality of prefetcher circuits, wherein the plurality of prefetcher circuits includes a first prefetcher circuit to monitor load requests from the processor and determine an address associated with a next load request from the processor and a second prefetcher circuit to monitor get requests from the processor and determine an address associated with a next get request from the processor.

In Example 17, at least one of Examples 14-16 can further include, wherein each NIC further comprises NIC logic circuitry configured to add one or more bits to a decode request indicating whether or not the decode request is associated with a prefetch operation.

In Example 18, at least one of Examples 14-17 can further include, wherein the each NIC further comprises SAD circuitry including a memory with respective entries detailing one or more of a memory type, an injection rate, and a granularity of a prefetching scheme to be used with a corresponding memory.

In Example 19, Example 18 can further include, wherein the SAD circuitry is further configured to adjust one or more of the injection rate and the granularity in response to feedback from the node on the different network.

In Example 20, Example 19 can further include, wherein the feedback includes one or more bits indicating whether to increase, decrease, or keep constant one or more of the injection rate and the granularity.

In Example 21, at least one of Examples 14-20 can further include, wherein the prefetcher circuitry includes first prefetcher circuitry configured to implement a first prefetching scheme and second prefetcher circuitry configured to implement a second, different prefetching scheme.

In Example 22, a method can include receiving, from a processor and at a network interface controller (NIC), a plurality of requests for data residing on a different network than the processor, determining, based on a plurality of addresses of the plurality of requests and by prefetcher circuitry of the NIC, one or more next addresses from which to prefetch data from the different network for the processor, issuing a prefetch request, by the NIC, for data from the determined one or more next addresses, and providing, to the processor, the data corresponding to the prefetch request.

In Example 23, Example 22 can further include, wherein the prefetcher circuitry includes a plurality of prefetcher circuits, and wherein determining the one or more addresses from which to prefetch data includes determining, using a prefetcher circuit of the plurality of prefetcher circuits dedicated to performing a prefetching scheme for a single remote memory, a next one or more addresses of the memory to be accessed by the processor.

In Example 24, at least one of Examples 22-23 can further include, wherein the prefetcher circuitry includes a plurality of prefetcher circuits, and the method further comprises monitoring, using a first prefetcher circuit of the plurality of prefetcher circuits, only load requests from the processor, determining, using the first prefetcher circuit, an address associated with a next load request from the processor, monitoring, using a second prefetcher circuit of the plurality of prefetcher circuits, only get requests from the processor, and determining, using the first prefetcher circuit, an address associated with a next get request from the processor.

In Example 25, at least one of Examples 22-24 can further include adding, by the NIC, one or more bits to a decode request indicating whether or not the decode request is associated with a prefetch operation.

In Example 26, at least one of Examples 22-25 can further include, wherein the SAD circuitry includes a memory with respective entries detailing one or more of a memory type, an injection rate, and a granularity of a prefetching scheme to be used with a corresponding memory and the method further comprises adjusting one or more of the injection rate and the granularity in response to feedback from the node on the different network.

In Example 27, Example 26 can further include, wherein the feedback includes one or more bits indicating whether to increase, decrease, or keep constant one or more of the injection rate and the granularity.

In Example 28, at least one of Examples 22-27 can further include, wherein the prefetcher circuitry includes first prefetcher circuitry and second prefetcher circuitry, and wherein determining the one or more addresses from which to prefetch data includes determining, using the first prefetcher circuit, a next one or more addresses of the memory to be accessed by the processor using a first prefetching scheme and determining, using the second prefetcher circuit, a next one or more addresses of a different memory to be accessed by the processor using a second prefetching scheme.

In Example 29, at least one of Examples 22-28 includes means for performing operations of the methods thereof.

Example 30 includes a network interface controller (NIC) including means for determining a node identification of a node to which a memory request from a processor is homed, and means for determining, based on an address in the memory request, one or more addresses from which to prefetch data, the one or more addresses corresponding to respective entries in a memory of a node on a different network than the NIC.

In Example 31, Example 30 can further include means for monitoring only load requests from the processor and determining an address associated with a next load request from the processor and other means for monitoring only get requests from the processor and determining an address associated with a next get request from the processor.

In Example 32, at least one of Examples 30-31 can further include means for adding one or more bits to a decode request indicating whether or not the decode request is associated with a prefetch operation.

In Example 33, at least one of Examples 30-32 can further include means for adjusting one or more of an injection rate and a granularity of prefetching in response to feedback from the node on the different network.

In Example 34, Example 33 can further include, wherein the feedback includes one or more bits indicating whether to increase, decrease, or keep constant one or more of the injection rate and the granularity.

Each of these non-limiting examples can stand on its own, or can be combined in various permutations or combinations with one or more of the other examples. Non-transitory merely means that the medium is a tangible media.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A network interface controller (NIC) of a first node, the NIC comprising:
hardware input/output (I/O) circuitry to receive, from system address decoder (SAD) circuitry, a node identification of a node to which a memory request from a processor is homed; and
hardware prefetcher circuitry communicatively coupled to the SAD circuitry, the prefetcher circuitry to determine, based on an address in the memory request, one or more addresses from which to prefetch data, the one or more addresses corresponding to respective entries in a memory of a second node on a different network than the NIC,
the NIC communicatively coupled between an external network switch and a processor of the first node.

2. The NIC of claim 1, wherein the prefetcher circuitry includes a plurality of prefetcher circuits each dedicated to predicting a next one or more addresses of a respective memory to be accessed by the processor.

3. The NIC of claim 1, wherein the prefetcher circuitry includes first prefetcher circuitry to monitor only load requests from the processor and determine an address associated with a next load request from the processor and second prefetcher circuitry to monitor only get requests from the processor and determine an address associated with a next get request from the processor.

4. The NIC of claim 1, further comprising NIC logic circuitry configured to add one or more bits to a decode request indicating whether or not the decode request is associated with a prefetch operation.

5. The NIC of claim 1, wherein the SAD circuitry includes a memory with a plurality of entries to indicate one or more of a memory type, an injection rate, and a granularity of a prefetching scheme to be used with a memory associated with a respective entry of the plurality of entries.

6. The NIC of claim 5, wherein the SAD circuitry is further configured to adjust one or more of the injection rate and the granularity in response to feedback from the node on the different network.

7. The NIC of claim 6, wherein the feedback includes one or more bits indicating whether to increase, decrease, or keep constant one or more of the injection rate and the granularity.

8. The NIC of claim 1, wherein the prefetcher circuitry includes first prefetcher circuitry configured to implement a first prefetching scheme and second prefetcher circuitry configured to implement a second, different prefetching scheme.

9. The NIC of claim 1, wherein the NIC includes the SAD circuitry.

10. A non-transitory machine-readable medium including instructions stored thereon that, when executed by a network interface controller (NIC), configure the NIC to:
receive, from a processor, a plurality of requests for data on a different network than the processor;
determine, based on a plurality of addresses of the plurality of requests, one or more addresses from which to prefetch data from the different network for the processor;
issue a prefetch request for data from the determined one or more addresses to an external network switch, the NIC communicatively coupled between the external network switch and the processor; and
provide, to the processor, the data corresponding to the prefetch request.

11. The non-transitory machine-readable medium of claim 10, further comprising instructions that, when executed by the NIC, configure the NIC to:
monitor, using first instructions of the instructions, only load requests from the processor;
determine, using the first instructions, an address associated with a next load request from the processor;
monitor, using second instructions of the instructions, only get requests from the processor; and
determine, using the second instructions, an address associated with a next get request from the processor.

12. The non-transitory machine-readable medium of claim 10, further comprising instructions that, when executed by the NIC, configure the NIC to add one or more bits to a decode request indicating whether or not the decode request is associated with a prefetch operation.

13. The non-transitory machine-readable medium of claim 10, further comprising instructions that, when executed by the NIC, configure the NIC to adjust one or more of an injection rate and a granularity value stored in a memory in response to feedback from the node on the different network.

14. The non-transitory machine-readable medium of claim 13, wherein the feedback includes one or more hits indicating whether to increase, decrease, or keep constant one or more of the injection rate and the granularity value.

15. A system operating in a computer network; the system comprising:
a plurality of communicatively coupled nodes, each node of the plurality of nodes including a network interface controller (NIC) coupled between a plurality of processors and an external network switch, each NIC comprising:
hardware system address decoder (SAD) circuitry configured to determine a node identification of a node to which a memory request from a processor is homed; and
hardware prefetcher circuitry communicatively coupled to the SAD circuitry, the prefetcher circuitry to determine one or more addresses from which to prefetch data; the one or more addresses corresponding to respective entries in a memory of a node on a different network than the computer network.

16. The system of claim 15, wherein the prefetcher circuitry includes a plurality of prefetcher circuits each dedicated to predicting a next one or more addresses of a respective memory to be accessed by the processor.

17. The system of claim 15, wherein the prefetcher circuitry includes a plurality of prefetcher circuits, wherein the plurality of prefetcher circuits includes a first prefetcher circuit to monitor load requests from the processor and determine an address associated with a next load request from the processor and a second prefetcher circuit to monitor get requests from the processor and determine an address associated with a next get request from the processor.

18. The system of claim 15, wherein each NIC further comprises:
NIC logic circuitry configured to add one or more bits to a decode request indicating whether or not the decode request is associated with a prefetch operation.

19. The system of claim 15, wherein the each NIC further comprises SAD circuitry including a memory with respective entries detailing one or more of a memory type, an injection rate, and a granularity of a prefetching scheme to be used with a corresponding memory.

20. The system of claim 19, wherein the SAD circuitry is further configured to adjust one or more of the injection rate and the granularity in response to feedback from the node on the different network.

21. The system of claim 20, wherein the feedback includes one or more bits indicating whether to increase, decrease, or keep constant one or more of the injection rate and the granularity.

22. The system of claim 15, wherein the prefetcher circuitry includes first prefetcher circuitry configured to implement a first prefetching scheme and second prefetcher circuitry configured to implement a second, different prefetching scheme.

23. A network interface controller (NIC) of a first node, the comprising:
    means for determining a node identification of a node to which a memory request from a processor of the first node is horned; and
    means for determining, based on an address in the memory request, one or more addresses from which to prefetch data, the one or more addresses corresponding to respective entries in a memory of a second node on a different network than the NIC,
    the NIC communicatively coupled between an external network switch and the processor of the first node.

24. The NIC of claim 23, further comprising means for monitoring only load requests from the processor and determining an address associated with a next load request from the processor and other means for monitoring only get requests from the processor and determining an address associated with a next get request from the processor.

25. The NIC of claim 23, further comprising means for adding one or more bits to a decode request indicating whether or not the decode request is associated with a prefetch operation.

26. The NIC of claim 23, further comprising means for adjusting one or more of an injection rate and a granularity of prefetching in response to feedback from the node on the different network.

27. The NIC of claim 26, wherein the feedback includes one or more bits indicating whether to increase, decrease, or keep constant one or more of the injection rate and the granularity.

28. A method comprising:
    receiving, from a processor of a first node and at a network interface controller (NIC) communicatively coupled between an external network switch and the processor, a plurality of requests for data residing on a different network than the processor;
    determining, based on a plurality of addresses of the plurality of requests and by the NIC, one or more next addresses from which to prefetch data from the different network for the processor;
    issuing a prefetch request, by the NIC, for data from the determined one or more next addresses; and
    providing, to the processor, the data corresponding to the prefetch request.

29. The method of claim 28, wherein the NIC includes a plurality of prefetcher circuits, and wherein determining the one or more addresses from which to prefetch data includes determining, using a prefetcher circuit of the plurality of prefetcher circuits dedicated to performing a prefetching scheme for a single remote memory, a next one or more addresses of the memory to be accessed by the processor.

30. The method of claim 29, further comprising:
    monitoring, using a first prefetcher circuit of the plurality of prefetcher circuits, only load requests from the processor;
    determining, using the first prefetcher circuit, an address associated with a next load request from the processor;
    monitoring, using a second prefetcher circuit of the plurality of prefetcher circuits, only get requests from the processor; and
    determining, using the first prefetcher circuit, an address associated with a next get request from the processor.

31. The method of claim 28, further comprising adding, by the NIC, one or more bits to a decode request indicating whether or not the decode request is associated with a prefetch operation.

32. The method of claim 28, wherein the NIC further includes SAD circuitry including a memory with respective entries detailing one or more of a memory type, an injection rate, and a granularity of a prefetching scheme to be used with a corresponding memory and the method further comprises adjusting one or more of the injection rate and the granularity in response to feedback from the node on the different network.

33. The method of claim 32, wherein the feedback includes one or more bits indicating whether to increase, decrease, or keep constant one or more of the injection rate and the granularity.

34. The method of claim 29, wherein determining the one or more addresses from which to prefetch data includes determining, using the first prefetcher circuit, a next one or more addresses of the memory to be accessed by the processor using a first prefetching scheme and determining, using the second prefetcher circuit, a next one or more addresses of a different memory to be accessed by the processor using a second prefetching scheme.

* * * * *

UNITED STATES PATENT AND TRADEMARK OFFICE
CERTIFICATE OF CORRECTION

PATENT NO. : 11,601,523 B2
APPLICATION NO. : 15/382103
DATED : March 7, 2023
INVENTOR(S) : Karthik Kumar et al.

It is certified that error appears in the above-identified patent and that said Letters Patent is hereby corrected as shown below:

In the Claims

In Column 20, Line 24, Amend Claim 14:
"wherein the feedback includes one or more hits"
To:
wherein the feedback includes one or more bits Signed and Sealed this
Eleventh Day of April, 2023

Katherine Kelly Vidal
*Director of the United States Patent and Trademark Office*